United States Patent
Iwatani et al.

(10) Patent No.: US 9,302,418 B2
(45) Date of Patent: Apr. 5, 2016

(54) RESIN FILM AND METHOD FOR PRODUCING SAME, PRINTED MATTER, LABEL AND RESIN MOLDED ARTICLE

(75) Inventors: Nobuhiro Iwatani, Ibaraki (JP); Hisao Ochiai, Ibaraki (JP)

(73) Assignee: YUPO CORPORATION, Tokyo (JP)

( * ) Notice: Subject to any disclaimer, the term of this patent is extended or adjusted under 35 U.S.C. 154(b) by 862 days.

(21) Appl. No.: 12/064,460

(22) PCT Filed: Aug. 23, 2006

(86) PCT No.: PCT/JP2006/316474
§ 371 (c)(1),
(2), (4) Date: May 8, 2008

(87) PCT Pub. No.: WO2007/023843
PCT Pub. Date: Mar. 1, 2007

(65) Prior Publication Data
US 2008/0280113 A1    Nov. 13, 2008

(30) Foreign Application Priority Data
Aug. 23, 2005   (JP) ................................. 2005-241192

(51) Int. Cl.

| | |
|---|---|
| B32B 27/16 | (2006.01) |
| B29C 47/06 | (2006.01) |
| B29C 55/02 | (2006.01) |
| B32B 27/08 | (2006.01) |
| B32B 27/20 | (2006.01) |
| B32B 27/32 | (2006.01) |
| B41M 5/50 | (2006.01) |
| B41M 5/52 | (2006.01) |
| B29C 47/00 | (2006.01) |
| B29C 47/14 | (2006.01) |
| B29K 23/00 | (2006.01) |
| B29K 105/16 | (2006.01) |
| B29K 105/00 | (2006.01) |
| B29L 9/00 | (2006.01) |
| B29L 31/00 | (2006.01) |
| B41M 7/00 | (2006.01) |

(52) U.S. Cl.
CPC ............. *B29C 47/06* (2013.01); *B29C 55/023* (2013.01); *B32B 27/08* (2013.01); *B32B 27/16* (2013.01); *B32B 27/20* (2013.01); *B32B 27/32* (2013.01); *B41M 5/506* (2013.01); *B41M 5/508* (2013.01); *B41M 5/52* (2013.01); *B41M 7/0081* (2013.01); *B29C 47/0004* (2013.01); *B29C 47/0021* (2013.01); *B29C 47/0057* (2013.01); *B29C 47/0069* (2013.01); *B29C 47/14* (2013.01); *B29C 2795/007* (2013.01); *B29K 2023/06* (2013.01); *B29K 2023/12* (2013.01); *B29K 2105/16* (2013.01); *B29K 2105/256* (2013.01); *B29K 2995/0022* (2013.01); *B29L 2009/00* (2013.01); *B29L 2031/744* (2013.01); *B41M 5/5218* (2013.01); *B41M 5/5254* (2013.01); *B41M 7/0072* (2013.01); *B41M 2205/12* (2013.01); *B41M 2205/38* (2013.01); *Y10T 428/24893* (2015.01)

(58) Field of Classification Search
USPC ....................................................... 428/195.1
See application file for complete search history.

(56) References Cited

U.S. PATENT DOCUMENTS

| | | | | |
|---|---|---|---|---|
| 3,936,567 | A * | 2/1976 | Vesely ........................... | 428/325 |
| 4,663,216 | A * | 5/1987 | Toyoda et al. ................ | 428/212 |
| 5,800,913 | A | 9/1998 | Mauer et al. | |
| 6,214,458 | B1 * | 4/2001 | Kobayashi et al. .......... | 428/32.5 |
| 6,306,490 | B1 | 10/2001 | Biddiscombe | |
| 2001/0003731 | A1 * | 6/2001 | Ochiai et al. .................. | 503/227 |
| 2002/0182391 | A1 | 12/2002 | Migliorini et al. | |
| 2003/0151247 | A1 * | 8/2003 | Nishizawa et al. ............. | 283/81 |
| 2003/0232210 | A1 * | 12/2003 | Haas et al. .................... | 428/500 |
| 2004/0023052 | A1 * | 2/2004 | Ambroise ..................... | 428/515 |
| 2005/0191449 | A1 * | 9/2005 | Funato et al. ................ | 428/34.1 |

FOREIGN PATENT DOCUMENTS

| | | |
|---|---|---|
| EP | 0 715 951 | 6/1996 |
| JP | 46-40794 | 12/1971 |
| JP | 56-118437 | 9/1981 |
| JP | 56-141339 | 11/1981 |
| JP | 61-3748 | 1/1986 |

(Continued)

OTHER PUBLICATIONS

"A Comparison of Corona-Treated and Flame-Treated Polypropylene Films," Strobel et al., Plasmas and Polymers, 2003, vol. 8, No. 1, p. 61-94.*

(Continued)

*Primary Examiner* — Ian Rummel
(74) *Attorney, Agent, or Firm* — Greenblum & Bernstein, P.L.C.

(57) ABSTRACT

A resin film comprising a multilayer structure of a print layer (A), a gloss-imparting layer (B) and a substrate layer (c) as laminated in that order, wherein the print layer (A) comprises from 90 to 100% of a propylene random copolymer or the like and from 0 to 10% of an inorganic fine powder or the like, the gloss-imparting layer (B) comprises from 70 to 100% of a thermoplastic resin and from 0 to 30% of an inorganic fine powder or the like, the substrate layer (C) comprises a thermoplastic resin, the resin film has a glossiness, as measured on the surface side of the print layer (A), of from 70 to 110%, the resin film has an oxygen atom concentration, as measured through X-ray photoelectron spectrometry on the surface side of the print layer (A), of from 5 to 20%. The printed matter of the resin film with a UV-curable ink has extremely good weather resistance.

11 Claims, No Drawings

(56) References Cited

FOREIGN PATENT DOCUMENTS

| JP | 1-295845 | 11/1989 |
|----|----------|---------|
| JP | 7-314622 | 12/1995 |
| JP | 9-076647 | 3/1997 |
| JP | 2000-001554 | 1/2000 |
| JP | 2001-233971 | 8/2001 |
| JP | 2004-528200 | 9/2004 |
| JP | 2005-263896 A | 9/2005 |
| WO | 96/20085 | 7/1996 |
| WO | WO 2004014650 A1 * | 2/2004 |

OTHER PUBLICATIONS

"Adhesion and Bonding to Polyolefins," Brewis et al., 2002, Rapra Review Reports, vol. 12, No. 11.*
English language Abstract of JP 7-314622.
English language Abstract of JP 2001-233971.
English language Abstract of JP 2000-001554.
English language Abstract of JP 9-076647.
English language Abstract of JP 56-141339.
English language Abstract of JP 56-118437.
English language Abstract of JP 1-295845.
Japanese Industrial Standard, JIS P 8142:2005 (Japan TAPPI/JSA), Japanese Industrial Standards Association.
Japanese Industrial Standard, JIS P 8138-1963, Japanese Industrial Standards Association.
Japanese Industrial Standard, JIS K 7350-4-1996 (ISO 4892-4:1994), Japanese Industrial Standards Association.
Database WPI Week 200422, Thomson Scientific, London, GB; AN 2004-229724, XP002545873, 2001.
Database WPI Week 200573, Thomson Scientific, London, GB; AN 2005-707669, XP002545874, 2005.
Extended European Search Report issued in connection with EP 06782927.5, Sep. 24, 2009.
Japanese Office Action dated Sep. 13, 2011 issued with respect to Japanese Patent Application No. 2006-224619, along with an English language translation.
English language translation of Japanese Industrial Standard JIS K 7350-4, Japanese Standards Association, 2008.
Ground for Opposition in European App. No. 06 782 927.5 and Patent No. 1 938 968, dated Jun. 22, 2012.
Chan, Chi-Ming, "Corona and Flame Treatments", The Hong Kong University of Science and Technology, 1994, pp. 266-273.
Summons to attend oral proceedings pursuant to Rule 115(1) EPC in European App. No. 06782927.5 and Patent No. 1 938 968, mailed Jan. 21, 2014.
Minutes of the oral proceedings before the Opposition Division for EP Application No. 06 782 927.5 and Patent No. 1 938 968, mailed Jul. 22, 2014.
Decision revoking the European Patent EP-B-1 938 968, mailed Jul. 22, 2014.

* cited by examiner

RESIN FILM AND METHOD FOR PRODUCING SAME, PRINTED MATTER, LABEL AND RESIN MOLDED ARTICLE

TECHNICAL FIELD

The present invention relates to a high-glossy resin film having an excellent aptitude for printing such as offset, letterpress, flexographic or gravure printing, especially to a resin film excellent in UV-curable ink transferability and fixability thereon and of such that the printed matter with the ink on it has extremely good weather resistance. The resin film of the invention is useful as a material for base paper for adhesive converted paper such as labels, stickers; base paper for in-mold labels; base paper for commercial printing such as posters, pamphlets, catalogues, signboards; base paper for wrapping paper; base paper for publishing such as maps, book covers, bookmarks, etc.

BACKGROUND ART

In place of pulp paper, synthetic paper, which comprises a substrate layer of a biaxially-stretched polypropylene film and, as formed on its surface and back, a paper layer of a monoaxially-stretched polypropylene film comprising from 8 to 65% by weight of a fine inorganic powder, has been proposed and put into practical use (for example, Patent References 1, 2, and 3). The synthetic paper is characterized in that, as compared with pulp paper, it has extremely high water resistance, and, for example, it is not swollen or broken by rainwater.

An application example of the synthetic paper, taking advantage of its water resistance, is paper for posters. Depending on the production purpose, they may require multi-color printing excellent in glossiness. In particular, travel posters, movie posters, campaign posters, and posters for commercial sale promotion for cars, refreshing drinks, etc., glossy multi-color offset printing is liked for producing a light and springy atmosphere.

Heretofore, such poster paper is to appeal to sight as if glossy printing be made thereon, for example, by laminating a transparent polyvinyl chloride film or the like on printed synthetic paper. The poster of the type laminated with a transparent resin film is problematic in that its production process is complicated and is disadvantageous in point of the schedule and the cost thereof.

As a method of overcoming the problem, high-glossy synthetic paper has been proposed (for example, Patent References 4 and 5) and put into practical use. The high-glossy synthetic paper of the type comprises a transparent resin layer of a propylene resin not substantially comprising a filler, as previously formed as a surface layer to be printed thereon. The high-glossy synthetic paper is printed thereon to give high-glossy printed matter. However, the transparent resin layer has a very little surface roughness capable of receiving ink penetrating thereinto. When a solvent-type ink or an oxidation drying-type ink is used for the synthetic paper of the type, then the vehicle, a component of the ink (low-molecular oil component) may penetrate into the resin of the surface layer, and therefore the ink fixation is good with no problem. However, in case where a UV-curable ink that has become popularized recently is used for printing on the synthetic paper, the ink component does not almost penetrate into the synthetic paper but would dry and solidify on the surface layer while it is just thereon; and therefore, though the ink could fix in some degree on the paper just after printing thereon but when it is exposed outdoor as posters, its fixation may lower within a relatively short period of time owing to the influence of sunlight and rainwater on it, and there occurs a problem in that the ink on the printed surface may drop off.

Specifically, the success in obtaining the conventional synthetic paper having a surface layer of a polypropylene resin (propylene homopolymer) and having excellent surface glossiness results from the omission of the surface filler so as to reduce the surface roughness as much as possible; however, the surface roughness capable of receiving ink to penetrate thereinto is extremely reduced, and therefore the fixation of UV-curable ink on the synthetic paper, especially the UV-curable ink fixation thereon under the condition based on the premise of using it outdoors is poor. Accordingly, the market has a great demand for high-glossy synthetic paper and for improving it to attain good UV-curable ink fixation thereon and to have good weather resistance capable of keeping it.

[Patent Reference 1]: JP-B 46-40794
[Patent Reference 2]: JP-A 56-141339
[Patent Reference 3]: JP-A 56-118437
[Patent Reference 4]: JP-A 61-3748
[Patent Reference 5]: JP-A 1-295845

DISCLOSURE OF THE INVENTION

Problems to be Solved by the Invention

Accordingly, an object of the invention is to provide a resin film capable of giving printed matter that has high glossiness and has extremely good ink fixability thereon even though printed with UV-curable ink, especially printed matter that has excellent weather resistance in relation to the ink fixability thereon.

Means for Solving the Problems

The present inventors have assiduously studied, taking the above-mentioned prior art problems into consideration, and, as a result, have found that a high-glossy resin film may overcome the above-mentioned problems, which includes a multilayer structure of a print layer (A), a gloss-imparting layer (B) and a substrate layer (c) as laminated in that order, and which is characterized in that the print layer (A) comprises from 90 to 100% of a propylene random copolymer and/or polyethylene and from 0 to 10% of an inorganic fine powder and/or an organic filler, that the gloss-imparting layer (B) comprises from 70 to 100% of a thermoplastic resin and from 0 to 30% of an inorganic fine powder and/or an organic filler, that the substrate layer (C) comprises a thermoplastic resin, that the glossiness (JIS P-8142), as measured on the surface side of the print layer (A), is from 70 to 110%, and that the oxygen atom concentration, as measured through X-ray photoelectron spectrometry on the surface side of the print layer (A), is from 5 to 20%.

Effect of the Invention

The resin film of the invention is highly glossy, and is favorably used for not only offset printing but also letterpress printing, flexographic printing, gravure printing, screen printing, etc. When the resin film is printed, it gives printed matter similarly having an appearance of high glossiness. In addition, it is excellent in the UV-curable printing ink transferability and fixability thereon, and is characterized in that the weather resistance of the printed matter of the resin film as printed with a UV-curable ink is extremely good. From these, the resin film of the invention is applicable to a broad use typically for printed matter and adhesive labels.

BEST MODE FOR CARRYING OUT THE INVENTION

The resin film of the invention is described in more detail hereinunder. The description of the constitutive elements of the invention given hereinunder is for some typical embodiments of the invention, to which, however, the invention should not be limited. In this description, the numerical range expressed by the wording "a number to another number" means the range that falls between the former number indicating the lowermost limit of the range and the latter number indicating the uppermost limit thereof inclusive. The description with "%" given herein especially for blending materials all means "% by weight".

[1] Resin Film:

(1) Print Layer (A):

The print layer (A) that constitutes the resin film of the invention is the outermost layer of the resin film, and its surface is printed thereon.

The difference from the conventional high-glossy synthetic paper is that a propylene random copolymer and/or polyethylene is used for the resin of the surface layer constituting it, in an amount of from 90 to 100%, and that the oxygen atom concentration, as measured through X-ray photoelectron spectroscopy on the surface side of the print layer, is controlled to fall within a range of from 5 to 20%.

The blend ratio of the propylene random copolymer and polyethylene for use in the print layer (A) may be determined in any desired manner; and only any one of them may be used. Preferred are a case where a propylene random copolymer alone is used, and a case where from 0 to 100 parts by weight, more preferably from 0 to 50 parts by weight of polyethylene is blended with 100 parts by weight of a propylene random copolymer.

For obtaining high glossiness, it is desirable that the surface of the print layer (A) is not so much roughened but is flat. So far as the surface layer is as flat as possible, then the incident light given onto it after printed may readily produce regular reflection, therefore readily producing a glossy feel. For this, it is more desirable that the inorganic fine power and/or the organic filler to be added to it is reduced to a degree of substantial absence (0 to 3%).

The oxygen atom concentration in the resin film of the invention, as measured through X-ray photoelectron spectroscopy on the surface side of the print layer (A), falls within a range of from 5 to 20%. For obtaining this range of the oxygen atom concentration, the surface of the print layer (A) is preferably oxidized; and the oxidation treatment is preferably corona discharge treatment with energy application of from 600 to 12,000 $J/m^2$.

The resin film of the invention enjoys good UV-curable ink fixability thereon and therefore its printed matter has weather resistance to long-term outdoor use; but the reason is not known sufficiently. The following reason may be presumed in case where the print layer (A) that is to be the outermost layer of the resin film and is to be in contact with ink is formed of a resin essentially comprising a propylene random copolymer.

Into the non-crystalline site of the copolymer resin, the resin component (monomer and prepolymer) of a UV-curable ink having a relatively large molecular weight may penetrate, thereby easily producing physical bonding force.

As compared with a conventional propylene homopolymer and others, the copolymer may easily obtain the effect of oxidation, and the effect may readily last, and therefore the layer may easily have chemical bonding force to the ink component.

As compared with a conventional propylene homopolymer, the copolymer is flexible, and even when external force is applied to the printed matter, it may be readily deformed along with the printed site (ink layer) with little peeling between the two layers.

(2) Gloss-Imparting Layer (B):

The gloss-imparting layer (B) that constitutes the resin film of the invention is sequentially laminated inside the print layer (A), and this is for improving the glossiness of the resin film.

In the invention, a transparent and smooth resin layer (print layer (A)) is formed on the surface, thereby obtaining a glossy appearance; but the light coming inside may be regularly reflected on the interface between the print layer (A) and the gloss-imparting layer (B) to thereby more efficiently increase the glossiness.

The gloss-imparting layer (B) is a transparent or semitransparent resin film layer that comprises from 70 to 100% of a thermoplastic resin, and from 0 to 30% of an inorganic fine powder and/or an organic filler; preferably from 75 to 100% of a thermoplastic resin, and from 0 to 25% of an inorganic fine powder and/or an organic filler.

In case where the gloss-imparting layer (B) is a transparent thermoplastic resin film layer substantially not comprising an inorganic fine powder and/or an organic filler, the light coming inside the gloss-imparting layer (B) is further regularly reflected on the interface between the gloss-imparting layer (B) and the substrate layer (C) that is described hereinunder, thereby further increasing more glossy appearance. Stretching the gloss-imparting layer (B) is preferred for obtaining more flat interface between the individual layers.

In case where the gloss-imparting layer (B) comprises an inorganic fine powder and/or an organic filler and when it is stretched, pores around the filler serving as nuclei may be formed inside the gloss-imparting layer (B). In this case, the light coming inside the gloss-imparting layer (B) may be efficiently reflected on the interface between resin and air in the pores, therefore obtaining high glossiness like in the above.

However, when the gloss-imparting layer (B) is stretched monoaxially, then the pores may be like rugby balls, and therefore the light reflection in the layer is so-called irregular reflection with poor directional orientation relative to the incident light, and the outward appearance may have a gloss with strong matted impression. In case where the gloss-imparting layer (B) is biaxially stretched, then the pores may be like more flattened disc, and the proportion of regular light reflection in the layer increases, and the outward appearance may have a gloss with strong pearly impression. Anyhow, when a filler is added, the glossy appearance may be difficult to obtain.

(3) Substrate Layer (C):

The substrate layer (C) that constitutes the resin film of the invention is so laminated on the gloss-imparting layer (B) that it is on the opposite side to the print layer (A). Accordingly, the resin film of the invention includes a multilayer structure of print layer (A)/gloss-imparting layer (B)/substrate layer (C) laminated in that order.

The substrate layer (C) comprises a thermoplastic resin, preferably comprises from 30 to 100% of a thermoplastic resin and from 0 to 70% of an inorganic fine powder and/or an organic filler, more preferably comprises from 50 to 100% of a thermoplastic resin and from 0 to 50% of an inorganic fine powder and/or an organic filler.

The substrate layer (C) is to be a core in forming the resin film of the invention. In particular, in case where the resin film of the invention is stretched, the layer is so provided as to be a support that realizes stable stretching formation.

(4) Propylene Random Copolymer:

For the propylene random copolymer for use in the print layer (A) that constitutes the resin film of the invention, usable is a random copolymer having various stereospecificity that essentially comprises propylene and is prepared through its copolymerization with an α-olefin such as ethylene, 1-butene, 1-hexene, 1-heptene, 4-methyl-1-pentene, etc. The copolymer comprise propylene in an amount of more than 50%. The copolymer may be binary or ternary or more polynary. Two or more such propylene copolymers having a different composition may be mixed for use herein. Preferably, the propylene copolymer has a melting point of from 70 to 160° C. When the melting point is 70° C. or higher, then the resin may have suitable flowability and its film formation is easy. When the melting point is 160° C. or lower, then it shows a suitable degree of crystallinity and may readily undergo surface oxidation, and may readily obtain good ink fixability thereon.

(5) Polyethylene:

Polyethylene for use in the print layer (A) that constitutes the resin film of the invention may be an ethylene copolymer essentially comprising ethylene and prepared through its copolymerization with any other copolymerization component, or an ethylene homopolymer, preferably having a melting point of from 50 to 140° C.

The copolymerization component to be copolymerized with ethylene includes an α-olefin having from 3 to 20 carbon atoms, such as propylene, 1-butene, 1-hexene, 1-heptene, 4-methyl-1-pentene, 1-octene, 1-decene, 1-dodecene, 1-eicosene; an olefin having 2 or more unsaturated bonds in one molecule, such as butadiene, isoprene, 1,4-hexadiene, dicyclopentadiene, ethylidene norbornene; further including others having an unsaturated bond capable of copolymerizing with ethylene, such as acrylic acid, methyl acrylate, ethyl acrylate, methacrylic acid, methyl methacrylate, vinyl acetate, vinyl alcohol, acrylonitrile, maleic anhydride, alkyl vinyl ether, allyl glycidyl ether, styrene. Of those, preferably employed are propylene, 1-butene, 1-hexene, acrylic acid, methyl acrylate, ethyl acrylate, methyl methacrylate.

The copolymer comprises ethylene in an amount of more than 50%. The copolymer may be binary, ternary or more polynary. Two or more such ethylene copolymers having a different composition may be mixed for use herein.

(6) Thermoplastic Resin:

The thermoplastic resin for use in the gloss-imparting layer (B) and the substrate layer (C) that constitute the resin film of the invention includes a polyolefin resin, a non-polyolefin resin and their mixture. Of those, preferred is a polyolefin resin.

The polyolefin resin comprises an α-olefin formed of carbon and hydrogen atoms, and its examples are propylene homopolymer, ethylene homopolymer, propylene copolymer, ethylene copolymer, polybutene-1, ethylene-butene-1 copolymer, polymethylpentene, cyclopentadiene-α-olefin copolymer.

Of those, more preferred are propylene homopolymer having a melting point of from 150 to 170° C., propylene copolymer having a melting point of from 70 to 160° C., ethylene homopolymer or ethylene copolymer having a melting point of from 50 to 140° C.

The non-polyolefin resin includes a vinyl polymer or an unsaturated polyester except polyolefin resin. Concretely, its examples are resins having an oxygen-containing functional group such as ethylene-vinyl acetate copolymer, ethylene-acrylic acid copolymer, ethylene-methacrylic acid copolymer, ethylene-methyl acrylate copolymer, ethylene-methyl methacrylate copolymer, ethylene-ethyl acrylate copolymer, maleic acid-modified polyethylene, maleic acid-modified polypropylene, polymethyl methacrylate, polyvinyl alcohol; resins having an oxygen-containing functional group of a diol such as ethylene vinyl alcohol, ethylene glycol, diethylene glycol, propylene glycol, dipropylene glycol, trimethylene glycol, 1,2-butanediol, 1,3-butanediol, 1,4-butanediol, 1,2-pentanediol, 1,6-hexanediol, cyclohexanediol, neopentyl glycol, 2,2,4-trimethyl-1,3-pentanediol, glycerin monoallyl ether, hydrogenated bisphenol A, 2,2-bis(4-hydroxyethoxyphenyl)propane, 2,2-bis(4-hydroxypropoxyphenyl)propane, a triol such as trimethylolpropane, a tetraol such as pentaerythritol; and chlorinated polyethylene, chlorinated polypropylene, polyvinyl chloride, polyvinylidene chloride.

Of the non-polyolefin resins, preferred are resins having an oxygen-containing functional group. The copolymer may be binary or ternary or more polynary, and may be a random copolymer, a block copolymer or a graft copolymer.

(7) Inorganic Fine Power and/or Organic Filler:

The print layer (A) that constitutes the resin film of the invention comprises from 0 to 10% of a filler such as an inorganic fine powder and/or an organic filler. When the filler content is more than 10%, then the film surface may be roughened and could not have desired glossiness and gloss feel. Preferably, the content is from 0 to 3%, more preferably the film does not substantially contain the filler. The wording "does not substantially contain" as referred to herein means that an inorganic fine powder and/or an organic filler is not intentionally added to the film, and this does not apply to contamination with it.

The gloss-imparting layer (B) and the substrate layer (C) constituting the resin film of the invention may comprise an inorganic fine powder and/or an organic filler.

The inorganic fine powder that may be used in the resin film of the invention may have a mean particle size of generally from 0.01 to 15 μm, preferably from 0.01 to 8 μm, more preferably from 0.03 to 4 μm. In the invention, the mean particle size of the inorganic fine powder is measured with a laser diffraction-type particle sizer "Microtrack".

Concretely, herein usable is an inorganic fine powder of calcium carbonate, calcined clay, silica, aluminosilicate, diatomaceous earth, talc, titanium oxide, barium sulfate, alumina, etc.

For the organic filler, preferably selected is a resin that differs from the thermoplastic resin for use in the gloss-imparting layer (B) and the substrate layer (C). For example, when the thermoplastic resin film is a polyolefin resin film, then the organic filler may be polyethylene terephthalate, polybutyleneterephthalate, polycarbonate, nylon-6, nylon-6,6, a homopolymer of a cyclic olefin or a copolymer of a cyclic olefin with ethylene having a melting point of from 120° C. to 300° C. or a glass transition temperature of from 120° C. to 280° C.

Regarding the content, the gloss-imparting layer (B) may comprise from 70 to 100% of a thermoplastic resin and from 0 to 30% of an inorganic fine powder and/or an organic filler, and the content of the filler is selected within a range within which the glossiness of the resin film is not lower than 70%.

In the substrate layer (C), the content of the inorganic fine powder and/or the organic filler is not specifically defined so far as it enables extrusion sheet formation and stretching formation. The content may be selected within a range within which the glossiness of the resin film is not lower than 70%.

(8) Other Auxiliary Additives:

If desired, the resin film of the invention may comprise a stabilizer, a light stabilizer, a lubricant, a dispersant, a crystallizer and the like added thereto.

The stabilizer may be a steric-hindered phenolic stabilizer, a phosphorus-containing stabilizer or an amine-type stabilizer, and its amount to be added may be generally within a range of from 0.001 to 1%.

The light stabilizer may be a steric-hindered amine-type, benzotriazole-type or benzophenone-type light stabilizer, and its amount to be added may be generally within a range of from 0.001 to 1%.

The lubricant is used for the purpose of dispersing the inorganic fine powder or for preventing burrs in shaping. Concretely, it includes a silane coupling agent, a higher fatty acid such as oleic acid, stearic acid, and their salts, polyacrylic acid, polymethacrylic acid and their salts. Its amount to be used may be generally within a range of from 0.01 to 4%.

The dispersant is used for finely dispersing the inorganic fine powder. For example, it includes a silane coupling agent, a higher fatty acid such as oleic acid, stearic acid, metal soap, polyacrylic acid, polymethacrylic acid or their salts, and its amount to be added may be from 0.01 to 4%.

(9) Layer Constitution:

The resin film of the invention has a multilayer structure comprising at least three layers of a print layer (A), a gloss-imparting layer (B) and a substrate layer (C).

Apart from the above-mentioned three-layer structure, the resin film of the invention may have any other structure having a print layer (A) and a gloss-imparting layer (B) provided symmetrically on both surfaces of a substrate layer (C) existing in the center (A/B/C/B/A), or having an additional resin film layer (D) on at least one surface of a substrate layer (C) (for example, A/B/C/D, A/B/D/C, A/B/D/C/D). Having any such multilayer structure, the print layer (A) should be the outermost layer of the resin film of the invention.

Further, the resin film of the invention may be a laminate with any other resin film, pulp paper, plain-woven fabric or nonwoven fabric. If desired, it may have an adhesive layer and lubricant paper (for example, A/B/C/adhesive/lubricant paper).

In addition, printed matter produced by printing on the resin film of the invention may be used as an in-mold label. Briefly, the label is set in a mold, and a resin-molded article is produced according to an injection molding or blow molding method, whereby a label-integrated, resin-molded article may be obtained. Preferably, the in-mold label has a known heat-seal resin layer laminated on the surface of the resin film opposite to the print layer (A) thereof (for example, A/B/C/heat-seal resin layer).

A shaped article having a laminate structure constructed by laminating the resin film of the invention on any other resin film or resin-shaped article as the outermost layer thereof is one preferred embodiment of the invention.

Printed matter prepared by printing on the resin film of the invention may be used not only as posters or labels stuck thereto, but may be used also as signboards or illuminant signboards laminated with a resin film having high rigidity, etc.

Preferably, the resin film is in the form of a laminate with any other resin film, for increasing its rigidity. For the additional resin film for increasing the rigidity, usable are not only the resin for use in the resin film of the invention but also other thermosetting resins such as epoxy resin, unsaturated polyester resin, phenolic resin, urea resin, melamine resin, polyurethane resin, silicone resin, diallyl phthalate resin. These may comprise an inorganic fine powder such as calcium carbonate, aluminosilicate, alumina, calcined clay, silica, diatomaceous earth, talc, titanium oxide, barium sulfate.

(10) Forming Method:

The method of forming the resin film of the invention is not specifically defined, and may be suitably selected from known methods.

For example, it may be formed according to a casting method that comprises sheetwise extruding a resin melt through a single-layered or multi-layered T-die or I-die connected with a screw extruder; an inflation forming method that comprises tubularly extruding a resin melt through an O-die connected with a screw extruder; a calendering method, a rolling method; or a method that comprises casting or calendering a mixture of a thermoplastic resin and an organic solvent or oil followed by removing the solvent or oil from it.

(11) Lamination:

The method of laminating the resin film of the invention is not specifically defined, and may be suitably selected from known methods.

For example, employable are a multilayer die system with a feed block and a multi-manifold, and an extrusion lamination system with plural dies. A multi-manifold and an extrusion lamination system may be combined for use herein. In addition, any other known lamination method of dry lamination, wet lamination or hot-melt lamination with an adhesive is also employable.

Concretely, in forming the resin film of the invention, a multilayer structure of print layer (A)/gloss-imparting layer (B)/substrate layer (C) laminated in that order may be formed through integral co-extrusion with a multilayer die system; or a substrate layer (C) is once shaped as a sheet according to the casting method of the above (10), and then a print layer (A) and a gloss-imparting layer (B) may be laminated thereon with a lamination system. In this case, plural dies may be sued and the print layer (A) and the gloss-imparting layer (B) may be separately and sequentially laminated; or a multilayer die may be sued and the print layer (A) and the gloss-imparting layer (B) may be simultaneously laminated through co-extrusion.

(12) Stretching:

Preferably, the resin film of the invention is stretched in at least one direction. After stretched, the resin film may have a thickness and stiffness suitable for printing paper, and in addition, the thickness fluctuation of the resin film may be reduced and the resin film may have a uniform thickness, and further it may have a flat surface and interface.

The layer stretching mode is not specifically defined. For example, the three-layer structure A/B/C may be monoaxially/monoaxially/monoaxially, monoaxially/monoaxially/biaxially, monoaxially/biaxially/monoaxially, biaxially/monoaxially/monoaxially, monoaxially/biaxially/biaxially, biaxially/biaxially/monoaxially, biaxially/biaxially/biaxially. For more multilayer structures, the layer stretching modes may be combined in any desired manner.

The stretching method is not specifically defined, and may be suitably selected from known methods. For example, employable is longitudinal stretching by the peripheral speed difference between rolls; cross stretching in a tenter oven; rolling; or simultaneous biaxial stretching with a combination of tenter oven and linear motor.

Preferably, the stretching temperature falls within a temperature range of not higher than the melting point of the thermoplastic resin for use for the substrate layer (C) (preferably a temperature range which is decreased by 2 to 20° C.

as compared with the melting point). Preferably, the stretching speed falls within a range of from 20 to 350 m/min.

The draw ratio is suitably determined in consideration of the characteristics of the thermoplastic resin for use for the substrate layer (C). For stretching in one direction, the draw ratio is generally from 2 to 12 times, preferably from 3 to 10 times, more preferably from 4 to 8 times; and for biaxial stretching, the areal draw ratio is generally from 4 to 80 times, preferably from 10 to 65 times, more preferably from 20 to 50 times.

(13) Thickness:

The thickness of the resin film of the invention is generally from 20 µm to 1000 µm, preferably from 30 µm to 500 µm, more preferably from 40 µm to 300 µm. When the thickness of the resin film is from 20 µm to 1000 µm, then it causes few failures in offset printing thereon, and its service value as printing paper is high.

(14) Glossiness:

The glossiness (JIS P-8142) of the surface of the print layer (A) of the resin film of the invention is from 70% to 110%, preferably from 70 to 105%, more preferably from 90 to 105%.

When the glossiness is less than 70%, then the printed matter prepared by printing on the resin film could not have a light and springy atmosphere owing to the matted mass influence thereon, and the initial object of the invention is difficult to attain. The constitution of the invention could hardly have a glossiness higher than 110%.

For making the glossiness at least 70%, the materials of the constitutive layers of the resin film may be suitably selected, and the stretching conditions (temperature, draw ratio) in producing the film may be suitably controlled.

(15) Opacity:

The opacity (JIS P-8138) of the resin film of the invention may be suitably determined depending on the use thereof.

The opacity of the resin film of the invention may be controlled by controlling the concentration of the inorganic fine powder and/or organic filler that the layer may comprise, the draw ratio of the resin film, the stretching temperature of the resin film, etc. In the resin film of the invention, the print layer (A) and the gloss-imparting layer (B) are transparent or semitransparent, and the opacity of the resin film may be readily controlled depending on the opacity of the substrate layer (C).

The resin film of the invention having an opacity of from 80% to 100% is opaque and is free from light transmission therethrough. Accordingly, it is favorably used for applications that require nontransparency to conceal linings, for example, for base paper for adhesive converted paper such as labels, stickers; base paper for commercial printing such as posters, pamphlets; base paper for wrapping paper, etc. When printing is made on the resin film having the above-mentioned opacity, then the printed pattern is not influenced by the back of the film and its outline is clear, and therefore, printed matter of good visibility can be obtained.

The resin film of the invention having an opacity of from 30% to less than 80% is semitransparent, and is used for applications for book covers, illuminant signboards, etc. Illuminant signboards are such that multi-color printing is made on one surface or both surfaces thereof and light from electric bulbs, fluorescent lamps, LED or the like is applied thereto on its back, thereby making visitors and passersby pay attention to the designs such as letters, photographs and patterns and to the instructions written on the film. These are well used for menus in fast-food shops of hamburgers, sushi and the like, and for advertisements in department stores or museums or on streets or underpasses, etc.

The resin film having an opacity of from 1% to less than 30% is transparent, and is used for applications for see-through adhesive labels, etc.

[2] Method of Surface Treatment:

(1) Oxidation Treatment:

Preferably, the resin film of the invention is subjected to oxidation treatment on its surface. The oxidation treatment may control the resin film surface to have a specific oxygen atom concentration as described hereinunder. As oxidized, the resin film surface may have a polar group and may therefore readily have a chemical bonding force to an ink component, and as a result, the fixability of a UV-curable ink on the resin film is thereby improved.

For the method of oxidation treatment of the surface of the resin film of the invention, usable are methods of corona discharge treatment, flame treatment, plasma treatment, glow discharge treatment, ozone treatment and the like generally used for films, either singly or as combined. Of those, preferred are corona discharge treatment and flame treatment; and more preferred is corona discharge treatment as its facilities and operation are easy.

For corona discharge treatment, the application energy may be generally within a range of from 600 to 12,000 J/m$^2$ (10 to 200 W·min/m$^2$), preferably from 720 to 9,000 J/m$^2$ (12 to 150 W·min/m$^2$), more preferably from 900 to 7,800 J/m$^2$ (15 to 130 W·min/m$^2$). For flame treatment, the application energy may be generally within a range of from 5,000 to 200,000 J/m$^2$, preferably 10,000 to 100,000 J/m$^2$.

(2) Oxygen Atom Concentration:

Within 1 week after the above oxidation treatment, the oxygen atom concentration in the surface of the resin film of the invention is measured, using an X-ray photoelectron spectrometer ESCA-3200 Model (by Shimadzu Seisakusho) with an X-ray source of Mg Kd ray (1254.0 eV), in vacuum of at most $1 \times 10^6$ Torr at a photoelectron emission angle of 90°. The oxygen atom peak to be measured is O1s peak (533 eV).

The oxygen atom concentration in the resin film of the invention is from 5 to 20%, preferably from 6 to 16%. When it is less than 5%, then the amount of the polar group to be formed in the film surface may be small and it is disadvantageous for UV-curable ink fixation on the film. Even if it is more than 20%, the effect may be saturated and may not increase any more, and if so, in addition, the excessive oxidation treatment may too much roughen the film surface and the glossiness of the printed surface of the film may be lowered.

For controlling the oxygen atom concentration in the resin film of the invention to fall within a range of from 5 to 20%, for example, the oxidation treatment method and the treatment range of the above-mentioned (1) are preferably employed.

(3) Anchor Agent:

The oxidation treatment of the resin film of the invention gives good fixability of UV-curable ink to the film. This effect may attenuate with the lapse of time after the treatment, and for imparting more stable ink fixability to the film, it is desirable to apply an anchor agent to the surface of the oxidation-treated print layer (A) thereby forming a coating layer thereon.

The anchor agent may be a polyimine polymer or a polyamine-polyamide/ethyleneimine adduct alone or as combined, optionally comprising a crosslinking agent added thereto.

The polyimine polymer or the polyamine-polyamide/ethyleneimine adduct includes polyethyleneimine, poly(ethyleneimine-urea) and polyamine-polyamide/ethyleneimine adduct, or their alkyl-modified derivatives, cycloalkyl-modified derivatives, aryl-modified derivatives, allyl-modified derivatives, aralkyl-modified derivatives, alkylaryl-modified derivatives, benzyl-modified derivatives, cyclopentyl-modified derivatives, or aliphatic cyclohydrocarbon-modified derivatives, as well as their hydroxides, and composites prepared by hybridizing a plurality of the above-mentioned compounds.

(4) Antistatic Agent:

Adding a polymer-type antistatic agent to the above-mentioned anchor agent may reduce troubles in printing on printers, such as dust adhesion to the resin film owing to static electricity, double sheet feeding, etc. The polymer-type antistatic agent usable herein includes cationic, anionic, ampholytic and nonionic agents. The cationic agent includes those having an ammonium salt structure or a phosphonium salt structure. The anionic agent includes those having a structure of an alkali metal salt of sulfonic acid, phosphoric acid, carboxylic acid or the like, or an alkali metal salt (e.g., lithium salt, sodium salt, potassium salt) of acrylic acid, methacrylic acid, maleic acid (anhydride) or the like in the molecular structure.

The ampholytic agent includes those having both the above-mentioned cationic and anionic structures in one molecule, and its examples are betaine compounds. The nonionic agent includes an ethylene oxide polymer having an alkylene oxide structure, and a polymer having an ethylene oxide polymer component in the molecular chain. In addition, also mentioned as its example is a polymer-type antistatic agent having boron in the molecular structure. Of those, preferred are cationic polymer-type antistatic agents; more preferred are nitrogen-containing polymer-type antistatic agents, more concretely tertiary nitrogen or quaternary nitrogen (ammonium salt structure)-containing acrylic polymers.

(5) Ratio of Anchor Agent and Antistatic Agent:

The ratio of the anchor agent and the antistatic agent to be used in the invention is, for making the individual components fully exhibit their capabilities, such that the amount of the antistatic agent is generally from 0 to 400 parts by weight relative to 100 parts by weight of the anchor agent as the solid fraction ratio, preferably from 20 to 300 parts, more preferably from 30 to 150 parts.

(6) Morphology of Anchor Agent:

The component of the anchor agent is dissolved in a solvent such as water or methyl alcohol, ethyl alcohol, isopropyl alcohol, acetone, methyl ethyl ketone, ethyl acetate, toluene, xylene or the like, and is used herein; and above all, the agent is used generally as an aqueous solution thereof. In view of the subsequent coating step, the concentration of the anchor agent solution is controlled generally to be from 0.5 to 40%, preferably from 1 to 20% or so for its easy and convenient handlability.

(7) Coating Amount of Anchor Agent:

The coating amount of the anchor agent to the resin film is generally from 0.01 to 3 $g/m^2$, preferably from 0.01 to 1 $g/m^2$, more preferably from 0.02 to 0.5 $g/m^2$, as the solid fraction. When the coating amount is less than 0.01 $g/m^2$, the fixability of printing ink could not be improved. When it is more than 3 $g/m^2$, the anchor agent solution could not be fully dried during the process and it may cause stickiness, and the use of excess material is disadvantageous in view of the production costs.

(8) Coating Device for Anchor Agent:

For applying the anchor agent to the resin film, usable are coating devices such as die coater, bar coater, lip coater, roll coater, gravure coater, spray coater, blade coater, air knife coater, size press coater.

[3] Adhesive Label Morphology:
(1) Adhesive Agent:

Laminated with an adhesive agent, the resin film of the invention may be used as an adhesive label.

The adhesive agent to be used for the adhesive label is, in general, typically a rubber adhesive, acrylic adhesive, a silicone adhesive, and any of these are usable in the invention. Examples of the rubber adhesive include polyisobutylene rubber, butyl rubber, their mixture, as well as a blend of the rubber adhesive with a tackifier such as rosin abietate, terpene-phenol copolymer, terpene-indene copolymer or the like. Examples of the acrylic adhesive include those having a glass transition point of not higher than −20° C., such as 2-ethylhexyl acrylate/n-butyl acrylate copolymer, 2-ethylhexyl acrylate/ethyl acrylate/methyl metacrylate copolymer.

Regarding its morphology, the adhesive may be in any form of solvent-type, emulsion-type or hot melt-type adhesives. In general, a solvent-type or emulsion-type adhesive may be applied for lamination.

The coating may be effected with a coating device such as die coater, bar coater, comma coater, lip coater, roll coater, gravure coater, spray coater, blade coater, reverse coater, air knife coater. After coated, this is optionally smoothed and dried to form an adhesive layer.

A general method for forming the adhesive layer comprises applying an adhesive agent to release paper mentioned below, drying it to form an adhesive layer, and laminating a resin film on it. As the case may be, an adhesive agent may be directly applied to the resin film and dried for layer formation thereon.

Not specifically defined, the coating amount of the adhesive agent is generally from 3 to 60 $g/m^2$, preferably from 10 to 40 $g/m^2$, as the solid fraction. The interlayer peeling strength of the adhesive layer is preferably from 200 to 3000 g/20 mm.

In case where the adhesive power between the resin film and the adhesive agent is small, it is desirable to previously apply an anchor agent to the resin film on the opposite surface to the side of the print layer (A) thereof, prior to coating with the adhesive agent. As the anchor agent, usable are polyurethane, polyisocyanate/polyether polyol, polyisocyanate/polyester polyol/polyethyleneimine, alkyl titanate, etc. In general, this is dissolved in an organic solvent such as methanol, ethyl acetate, toluene, hexane, or water, and is used herein. The coating amount of the anchor agent is preferably from 0.01 to 5 $g/m^2$, more preferably from 0.02 to 2 $g/m^2$, as the solid fraction after the coating and the drying.

(2) Release Paper:

With release paper attached via the above-mentioned adhesive agent, the resin film of the invention may be used as base paper for adhesive labels.

The release paper to be attached to the resin film via an adhesive layer therebetween generally has silicone treatment on its surface to be contacted with an adhesive layer, for improving the releasability from the adhesive layer.

The release paper may be one generally available on the market, for which, for example, usable are woodfree paper and kraft paper directly as they are, or woodfree paper and kraft paper after calendered or coated with resin or after laminated with film, as well as glassine paper, coated paper, plastic film and others, and those subjected to silicone treatment.

[4] Printing:
(1) Type of Ink:

UV-curable ink is an ink that undergoes photochemical reaction with UV energy, and solidifies from liquid to solid by a second unit to form a film. The major ingredients of the ink are a vehicle comprising a photopolymerizable prepolymer or monomer, a photopolymerization initiator, a colorant and a promoter, and in principle, it does not comprise an organic solvent. Accordingly, its most characteristic feature is that the ink could be a completely (100%) solid, solvent-free ink. As compared with a solvent-type ink, the advantage of the UV-curable ink is that it may dry rapid, its film strength is high, it may realize a solvent-free printing process, and since the ink does not dry on a printing plate, it may readily contribute to long-term stable printing operation. Development of a UV-curable drying system has solved the problem of "drying" that has been a significant bar to application of printing to plastics, and the system has already been put into practical use.

To the resin film of the invention, applicable is any UV-curable ink for offset printing, letterpress printing, flexographic printing, screen printing and the like. Accordingly, the UV-curable ink for use in the invention includes various inks of offset printing ink, letterpress printing ink, flexographic printing ink, screen printing ink, etc.

The ink viscosity varies, depending on the type of ink and on the printing system; and in offset printing, for example, it may be from 300 to 800 dPa·s, but in flexographic printing, it may be from 1 to 2 dPa·s, and the two differ greatly. For the ink for use in the invention, any one generally used in various printing systems may be suitably selected.

In the invention, in particular, the fixability of UV-curable ink is improved; but apart from it, solvent-type ink and oxidation drying-type ink may also favorably used in printing.

(2) Printer:

Various printing modes are applicable to the resin film of the invention, including not only offset printing, but also letterpress printing, flexographic printing, gravure printing, screen printing, etc.

(3) Use:

As printed thereon in the manner mentioned hereinabove, the resin film of the invention may give printed matter.

For example, it is useful as commercial printed matter such as posters, pamphlets, catalogues, signboards; publications and wrapping paper such as books, maps, book covers, bookmarks, etc.

In addition, the resin film of the invention may be laminated with an adhesive layer to give adhesive labels, and is thus usable for applications for labels, stickers, pops, seals, etc.

Further, the resin film of the invention may be formed into an in-mold label, as laminated with a heat-seal layer, and it may give a resin-molded article with the label integrally attached thereto.

(4) Evaluation of Printed Matter:

In the invention, a resin film was printed and the obtained printed matter was evaluated, according to the following method.

(a) Printing:

For printing, used were a printer "RI-III Model Printability Tester" (trade name by Akira Seisakusho) and a UV-curable printing ink "Best Cure® 161 (Indian ink)" (trade name by T&K TOKA). For UV irradiation for solidifying the printed ink, used was "First UV2400" (trade name by First Printing System).

A resin film of the invention was conditioned in an atmosphere at 23° C. and a relative humidity of 50% for 3 days, and then the surface of the print layer (A) of the resin film was printed with the above-mentioned ink in a mode of solid printing to a thickness of 1.5 g/m$^2$, using the above-mentioned printer. After printed, the print surface of the resin film was subjected to UV irradiation under a condition of 100 mJ/cm$^2$, using the above-mentioned UV irradiator, whereby the ink was dried.

In all Examples and Comparative Examples mentioned below, the samples on which the ink had been dried was conditioned in an atmosphere at 23° C. and a relative humidity of 50% for 2 hours were evaluated in the same manner as that for the ink fixability (c) mentioned below; and all the samples had good ink fixability with the ink retentiveness of nearly 100% (level OO).

(b) Weather Resistance Acceleration Treatment (Exposure Test):

For evaluation of weather resistance under the premise of outdoor use, when samples are actually subjected to an outdoor exposure test, then the results may often fluctuate owing to various factors such as climates, weather, etc.

In the invention, a printed resin film was subjected to weather resistance acceleration treatment (exposure test) under a uniform condition according to JIS K-7350-4. More concretely, the following condition was employed.

A carbon arc lamp on an upper side, having a diameter of 36 mm and a length of 410 mm; and a carbon ark lamp on a lower side, having a diameter of 23 mm and a length of 410 mm, were used.

As a glass filter, used was an I-type filter (trade name "#255" by Suga Test Instruments).

The black panel temperature was 63° C.

A water spray system was used for water spraying. Regarding the spray cycle, water spraying was continued for 18 minutes in one cycle of 120 minutes.

The irradiation illuminance on the surface of the test piece was 255 W/m$^2$, the exposure time was 30 hours; and the light irradiation amount was $2.75 \times 10^7$ J/m$^2$.

Two same test pieces under the same condition were prepared for each sample (printed sample of the above (a)), and all the test pieces were collectively set in the exposure tester and subjected to weather resistance acceleration treatment as a whole.

(c) Ink Fixability:

The fixability on a UV-curable printing ink was evaluated as follows: A sample was printed as in the above (a), then subjected to the weather resistance acceleration treatment as in the above (b), and conditioned in an atmosphere at 23° C. and a relative humidity of 50% for 2 hours, and thereafter an adhesive tape "Cellotape®" (trade name by Nichiban) was forcedly pressed against the print surface, and then the adhesive tape was rapidly peeled by hand along the print surface, whereupon the ink-remaining area of the peeled part was checked visually, and the ink retentiveness was determined.

Samples having a larger ink retentiveness have better fixability of the UV-curable printing ink on the resin film, and the printed matter thereof with the UV-curable ink has better weather resistance.

The ink retentiveness was obtained by dividing the area on in which the ink remained on the resin film after peeled from the adhesive tape, by the overall area to which the adhesive tape had been stuck. The samples were evaluated according to the following evaluation standard. Two test pieces of one sample were averaged, and the samples having an ink retentiveness of 70% or more (◎ to ○) are on a pass level.

◎: Ink retentiveness is from 90% to 100%.

○: Ink retentiveness is from 70% to less than 90%.

Δ: Ink retentiveness is less than 70%.

EXAMPLES

The invention is described in more detail with reference to the following Examples and Comparative Examples. In the following Examples, the material used, its amount and the ratio, the details of the treatment and the treatment process may be suitably modified or changed not overstepping the scope of the invention. Accordingly, the invention should not be limitatively interpreted by the Examples mentioned below.

Production Example 1

(1) A mixture (C) prepared by mixing 75% by weight of a propylene homopolymer "Novatec PP MA-8Q" (trade name by Nippon Polypro, melting point 161° C.) with 25% by weight of heavy calcium carbonate having a mean particle size of 3.0 μm "Softon 1800" (trade name by Bihoku Funka Kogyo) was kneaded in an extruder set at 270° C., then sheetwise extruded out, and cooled with a cooling device to obtain an unstretched sheet. Next, this sheet was again heated up to 150° C. and then stretched by 5 times in the machine direction to obtain an MD-stretched resin film.

(2) A propylene random copolymer "Novatec PP FG4" (trade name by Nippon Polypro, melting point 142° C.) (A) and a propylene homopolymer "Novatec PP MA-3AQ" (trade name by Nippon Polypro, melting point 162° C.) (B) were separately melt-kneaded in different extruders set at 270° C., and then co-extruded through one-die while layered inside the die, and this was laminated on one surface of the 5-time MD-stretched resin film obtained in the above step (1) in such a manner that the layer of (A) could be a surface layer.

(3) Further, a mixture (E) prepared by mixing 55% by weight of a propylene random copolymer "Novatec PP FG4AQ" (trade name by Nippon Polypro, melting point 139° C.) and 45% by weight of heavy calcium carbonate having a mean particle size of 3.0 μm "Softon 1800" (trade name by Bihoku Funka Kogyo), and a propylene homopolymer "Novatec PP MA-3AQ" (trade name by Nippon Polypro, melting point 162° C.) (D) were separately melt-kneaded in different extruders set at 270° C., and then co-extruded through one-die while layered inside the die, and this was laminated on the other surface of the 5-time MD-stretched resin film obtained in the above step (1) in such a manner that the layer of (E) could be a surface layer, thereby producing a 5-layered laminate sheet. Next, the 5-layered laminate sheet was cooled to 60° C., then again heated up to 155° C., and stretched by 8.5 times in the cross direction, then annealed at 165° C. and cooled to 60° C., and this was trimmed at its edges to obtain a 5-layered (monoaxially stretched/monoaxially stretched/biaxially stretched/monoaxially stretched/monoaxially stretched) resin film having a thickness of 110 μm (A/B/C/D/E=5 μm/15 μm/70 μm/15 μm/5 μm).

(4) Both surfaces of the resin film were processed for corona discharge treatment, using a corona discharger "HF400F" (trade name by Kasuga Electric) in which the aluminium electrode had a length of 0.8 m, the treater roll was a silicone-coated roll, the electrode-roll gap was 5 mm, the line processing speed was 15 m/min, and the applied energy density was 2,000 J/m$^2$ (33 W·min/m$^2$).

(5) The obtained resin film had a glossiness of 105% on the surface of the layer (A), and had a glossiness of 14% on the surface of the layer (E). Thus, the surface on the side of the layer (A) of the film had a highly-glossy appearance, and the surface on the side of the layer (E) thereof had a mat appearance. The oxygen atom concentration, as measured through X-ray photoelectron spectroscopy on the surface side of the layer (A), was 11%.

Production Example 2

(1) A propylene random copolymer "Novatec PP FG4" (trade name by Nippon Polypro, melting point 142° C.) (A); a composition (B) of a mixture of 75% by weight of a propylene homopolymer "Novatec PP MA-8Q" (trade name by Nippon Polypro, melting point 161° C.) and 25% by weight of heavy calcium carbonate having a mean particle size of 3.0 μm "Softon 1800" (trade name by Bihoku Funka Kogyo); and a composition (C) of a mixture of 75% by weight of a propylene homopolymer "Novatec PP MA-3AQ" (trade name by Nippon Polypro, melting point 162° C.) and 25% by weight of heavy calcium carbonate having mean particle size of 3.0 μm "Softon 1800" (trade name by Bihoku Funka Kogyo) were prepared. These compositions (A), (B) and (C) were separately melt-kneaded in different extruders set at 270° C., and then sheetwise co-extruded through one-die while layered in order inside the die, and thereafter this was cooled with a cooling device to obtain a three-layered unstretched laminate sheet.

(2) Next, the three-layered laminate sheet was cooled to 60° C., using a cooling device, then again heated up to 150° C., and stretched by 5 times in the machine direction, further heated up to 155° C., and, using a tenter, this was stretched by 8.5 times in the cross direction, then annealed at 165° C., cooled to 60° C., and trimmed at its edges to obtain a three-layered (biaxially stretched/biaxially stretched/biaxially stretched) resin film having a thickness of 110 μm (A/B/C=10 μm/90 μm/10 μm).

(3) The surface of the resin film on the side of the layer (A) was processed for corona discharge treatment, using a corona discharger "HF400F" (trade name by Kasuga Electric) in which the aluminium electrode had a length of 0.8 m, the treater roll was a silicone-coated roll, the electrode-roll gap was 5 mm, the line processing speed was 15 m/min, and the applied energy density was 2,000 J/m$^2$ (33 W·min/m$^2$).

Production Example 3

(1) A propylene random copolymer "Novatec PP FG4" (trade name by Nippon Polypro, melting point 142° C.) (A); a composition (B) of a mixture of 75% by weight of a propylene homopolymer "Novatec PP MA-8Q" (trade name by Nippon Polypro, melting point 161° C.) and 25% by weight of heavy calcium carbonate having a mean particle size of 3.0 μm "Softon 1800" (trade name by Bihoku Funka Kogyo); and a composition (C) of a mixture of 75% by weight of a propylene homopolymer "Novatec PP MA-3AQ" (trade name by Nippon Polypro, melting point 162° C.) and 25% by weight of heavy calcium carbonate having mean particle size of 3.0 μm "Softon 1800" (trade name by Bihoku Funka Kogyo) were prepared. These compositions (A), (B) and (C) were separately melt-kneaded in different extruders set at 270° C., and then sheetwise co-extruded through one-die while layered in order inside the die, and thereafter this was cooled with a cooling device to obtain a three-layered unstretched laminate sheet. Next, this was again heated up to 150° C., then stretched by 7 times in the machine direction, and annealed at 155° C. to obtain a three layered (monoaxially stretched/monoaxially stretched/monoaxially stretched) resin film having a thickness of 110 μm (A/B/C=10 μm/90 μm/10 μm).

(2) The surface of the resin film on the side of the layer (A) was processed for corona discharge treatment, using a corona discharger "HF400F" (trade name by Kasuga Electric) in which the aluminium electrode had a length of 0.8 m, the treater roll was a silicone-coated roll, the electrode-roll gap was 5 mm, the line processing speed was 15 m/min, and the applied energy density was 2,000 J/m$^2$ (33 W·min/m$^2$).

Production Example 4

A resin film was produced in the same manner as in Production Example 1, for which, however, the composition (A)

in Production Example 1 was changed to a high-density polyethylene "Novatec HD HJ451" (trade name by Nippon Polyethylene, melting point 132° C.).

Production Example 5

A resin film was produced in the same manner as in Production Example 1, for which, however, the composition (A) in Production Example 1 was changed to a mixture of 75% by weight of a propylene random copolymer "Novatec PP FG4" (trade name by Nippon Polypro, melting point 142° C.) and 25% by weight of an ethylene-methyl acrylate copolymer "Rexpearl RB6200" (trade name by Nippon Polyethylene, melting point 77° C., ethylene content 80%).

Production Example 6

A resin film was produced in the same manner as in Production Example 1, for which, however, the composition (B) in Production Example 1 was changed to a mixture of 50% by weight of a propylene random copolymer "Novatec PP FG4" (trade name by Nippon Polypro, melting point 142° C.) and 50% by weight of a high-density polyethylene "Novatec HD HJ451" (trade name by Nippon Polyethylene, melting point 132° C.).

Production Example 7

A resin film was produced in the same manner as in Production Example 1, for which, however, the composition (C) in Production Example 1 was changed to a composition prepared by mixing 95% by weight of a propylene homopolymer "Novatec PP MA-8Q" (trade name by Nippon Polypro, melting point 161° C.) and 5% by weight of heavy calcium carbonate having a mean particle size of 3.0 μm "Softon 1800" (trade name by Bihoku Funka Kogyo), and the compositions (B) and (D) were changed to a composition prepared by mixing 70% by weight of a propylene homopolymer "Novatec PPMA-3AQ" (trade name by Nippon Polypro, melting point 162° C.) and 30% by weight of heavy calcium carbonate having a mean particle size of 3.0 μm "Softon 1800" (trade name by Bihoku Funka Kogyo).

Production Example 8

A resin film was produced in the same manner as in Production Example 1, for which, however, the composition (C) in Production Example 1 was changed to a composition prepared by mixing 99% by weight of a propylene homopolymer "Novatec PP MA-8Q" (trade name by Nippon Polypro, melting point 161° C.) and 1% by weight of heavy calcium carbonate having a mean particle size of 3.0 μm "Softon 1800" (trade name by Bihoku Funka Kogyo), the compositions (B) and (D) were changed to a composition prepared by mixing 99% by weight of a propylene homopolymer "Novatec PP MA-3AQ" (trade name by Nippon Polypro, melting point 162° C.) and 1% by weight of heavy calcium carbonate having a mean particle size of 3.0 μm "Softon 1800" (trade name by Bihoku Funka Kogyo), and the composition (E) was changed to the same one as the composition (A).

Production Example 9

A resin film was produced in the same manner as in Production Example 1, for which, however, as conventional synthetic paper having a surface layer of a propylene homopolymer, the composition (A) in Production Example 1 was changed to a propylene homopolymer "Novatec PP MA-5Q" (trade name by Nippon Polypro, melting point 160° C.) and the composition (B) was changed to a composition prepared by mixing 55% by weight of a propylene homopolymer "Novatec PP MA-3AQ" (trade name by Nippon Polypro, melting point 162° C.) and 45% by weight of heavy calcium carbonate having a mean particle size of 3.0 μm "Softon 1800" (trade name by Bihoku Funka Kogyo).

Synthesis Example 1

As a component of a coating agent (i), produced was a glycidol-modified polyimine polymer according to the process mentioned below. This is used as an anchor agent.

100 parts by weight of an aqueous 25 wt. % solution of polyethyleneimine "Epomin P-1000 (degree of polymerization 1600)" (trade name by Nippon Shokubai), 10 parts by weight of glycidol and 10 parts by weight of propylene glycol monomethyl ether were put into a four-neck flask equipped with a stirrer, a reflux condenser, a thermometer and a nitrogen gas inlet port, and stirred in a nitrogen atmosphere, and thus modified at 80° C. for 16 hours to obtain an aqueous solution of glycidol-modified polyethyleneimine. This was dried, and analyzed through IR spectrometry, $^1$H-nuclear magnetic resonance spectrometry ($^1$H-NMR) and $^{13}$C-nuclear magnetic resonance spectrometry ($^{13}$C-NMR), which confirmed that the product had a structure formed through addition of the epoxy group of glycidol to the nitrogen atom of polyethyleneimine and that 23% of the nitrogen atom of polyethyleneimine was reacted with glycidol.

Production Example 2

As a component of a coating agent (ii), produced was a cationic acrylic copolymer according to the process mentioned below. This is used as an antistatic agent.

35 parts by weight of dimethylaminoethyl methacrylate, 20 parts by weight of ethyl methacrylate, 20 parts by weight of cyclohexyl methacrylate, 25 parts by weight of stearyl methacrylate, 150 parts by weight of ethyl alcohol and 1 part by weight of azobisisobutyronitrile were put into a four-neck flask equipped with a reflux condenser, a thermometer, a glass tube for nitrogen purging, and a stirrer, and polymerized at 80° C. in a nitrogen atmosphere for 6 hours.

Next, 70 parts by weight of a 60 wt. % solution of 3-chloro-2-hydroxypropylammonium chloride in ethyl alcohol was added to it, and further reacted at 80° C. for 15 hours. Then, with dropwise adding water, ethyl alcohol was evaporated away to obtain a quaternary ammonium salt-type copolymer having a final solid content of 30%.

The copolymer is an alkyl acrylate polymer having a group of the following general formula, in the molecular chain.

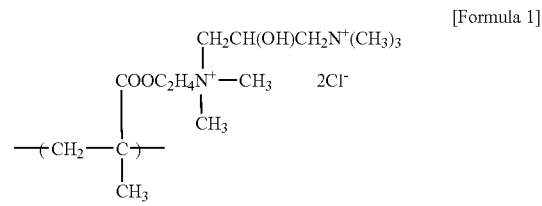

[Formula 1]

Example 1

Using a roll coater, a coating agent comprising 100 parts by weight of the component (i) of coating agent of the above-mentioned Synthesis Example 1 and 100 parts by weight of the component (ii) of coating agent of Synthesis Example 2 was applied to the resin film of Production Example 1 on the surface side of the layer (A), thereby forming a coating film to have a thickness of 0.05 g/m², and dried to obtain a resin film.

Example 2

The resin film of Production Example 1 was used.

Example 3

A resin film was obtained in the same manner as in Example 1, for which, however, the applied energy in corona discharge treatment was changed to 900 J/m² (15 W·min/m²).

Example 4

A resin film was obtained in the same manner as in Example 1, for which, however, the applied energy in corona discharge treatment was changed to 7,500 J/m² (125 W·min/m²).

Reference Example 5

A resin film was obtained by applying the same coating agent as in Example 1 to the resin film of Production Example 4.

Reference Example 6

A resin film was obtained in the same manner as in Example 5, for which, however, the applied energy in corona discharge treatment was changed to 7,500 J/m² (125 W·min/m²).

Reference Example 7

A resin film was obtained by applying the same coating agent as in Example 1 to the resin film of Production Example 5.

Example 8

A resin film was obtained by applying the same coating agent as in Example 1 to the resin film of Production Example 6.

Example 9

A resin film was obtained by applying the same coating agent as in Example 1 to the resin film of Production Example 7.

Example 10

A resin film was obtained by applying the same coating agent as in Example 1 to the resin film of Production Example 8.

Example 11

A resin film was obtained by applying the same coating agent as in Example 1 to the resin film of Production Example 2.

Example 12

A resin film was obtained by applying the same coating agent as in Example 1 to the resin film of Production Example 3.

Comparative Example 1

A resin film was obtained in the same manner as in Example 1, for which, however, the applied energy in corona discharge treatment was changed to 300 J/m² (5 W·min/m²).

Comparative Example 2

A resin film was obtained by applying the same coating agent as in Example 1 to the resin film of Production Example 9.

Comparative Example 3

A resin film was obtained in the same manner as in Comparative Example 2, for which, however, the applied energy in corona discharge treatment was changed to 900 J/m² (15 W·min/m²).

Comparative Example 4

A resin film was obtained in the same manner as in Comparative Example 2, for which, however, the applied energy in corona discharge treatment was changed to 7,500 J/m² (125 W·min/m²).

Comparative Example 5

A resin film was obtained by applying the same corona discharge treatment as in Example 1 to a stretched resin film described in Example 1 in JP-A 7-314622.

(Evaluation Result)

The resin films obtained in Examples 1 to 12 and Comparative Examples 1 to 5 were analyzed to determine the oxygen atom concentration therein according to the above-mentioned method, to determine the glossiness according to JIS P-8142, to determine the opacity according to JIS P-8138, and to evaluate the ink fixability after weather resistance acceleration treatment according to the above-mentioned method. The results of evaluation are shown in Table 1.

[Table 1]

TABLE 1

|  | Thermoplastic Resin Film | Discharge Level (J/m²) | Coating Agent | Oxygen Atom Concentration (%) | Glossiness (%) | Opacity (%) | UV Ink Fixability after weather resistance acceleration |
|---|---|---|---|---|---|---|---|
| Example 1 | Production Example 1 | 2,000 | yes | 11 | 105 | 90 | ⊚ |
| Example 2 | Production Example 1 | 2,000 | no | 11 | 105 | 90 | ○ |
| Example 3 | Production Example 1 | 900 | yes | 7 | 105 | 90 | ○ |
| Example 4 | Production Example 1 | 7,500 | yes | 15 | 105 | 90 | ⊚ |
| Reference Example 5 | Production Example 4 | 2,000 | yes | 13 | 105 | 90 | ⊚ |

TABLE 1-continued

|  | Thermoplastic Resin Film | Discharge Level (J/m$^2$) | Coating Agent | Oxygen Atom Concentration (%) | Glossiness (%) | Opacity (%) | UV Ink Fixability after weather resistance acceleration |
|---|---|---|---|---|---|---|---|
| Reference Example 6 | Production Example 4 | 7,500 | yes | 20 | 105 | 90 | ⊚ |
| Reference Example 7 | Production Example 5 | 2,000 | yes | 13 | 90 | 90 | ⊚ |
| Example 8 | Production Example 6 | 2,000 | yes | 13 | 72 | 90 | ⊚ |
| Example 9 | Production Example 7 | 2,000 | yes | 11 | 75 | 65 | ⊚ |
| Example 10 | Production Example 8 | 2,000 | yes | 11 | 95 | 15 | ⊚ |
| Example 11 | Production Example 2 | 2,000 | yes | 11 | 105 | 90 | ⊚ |
| Example 12 | Production Example 3 | 2,000 | yes | 11 | 105 | 90 | ⊚ |
| Comparative Example 1 | Production Example 1 | 300 | yes | 3 | 105 | 90 | Δ |
| Comparative Example 2 | Production Example 9 | 2,000 | yes | 8 | 90 | 93 | Δ |
| Comparative Example 3 | Production Example 9 | 900 | yes | 5 | 90 | 93 | Δ |
| Comparative Example 4 | Production Example 9 | 7,500 | yes | 11 | 90 | 93 | Δ |
| Comparative Example 5 | Example 1 in JP-A 7-314622 | 2,000 | yes | 11 | 14 | 95 | ○ |

INDUSTRIAL APPLICABILITY

The resin film of the invention is not only excellent in printing ink transferability and fixability but also, in particular, the printed matter thereof printed with a UV-curable ink has extremely good weather resistance; and the resin film is excellent in not only offset but also letterpress, flexographic or gravure printability. Having the characteristics, the resin film of the invention is usable in a wide variety of applications such as typically printed matter and adhesive labels. Accordingly, the industrial applicability of the invention is extremely good.

The invention claimed is:

1. A resin film comprising a multilayer structure of a print layer (A), a gloss-imparting layer (B) and a substrate layer (C) as laminated in that order, wherein:
   the print layer (A) comprises from 90 to 100% of a propylene random copolymer having a melting point of from 70 to 142° C. or a mixture of propylene random copolymer and an ethylene copolymer comprising ethylene in an amount of more than 50% and from 0 to 10% of an inorganic fine powder and/or an organic filler,
   the gloss-imparting layer (B) comprises from 70 to 100% of a thermoplastic resin and from 0 to 30% of an inorganic fine powder and/or an organic filler, and
   the substrate layer (C) comprises a thermoplastic resin; and wherein
   the resin film has a glossiness (JIS P-8142), as measured on the surface side of the print layer (A), of from 70 to 110%,
   the resin film has an oxygen atom concentration of from 5 to 20% as measured on the surface side of the print layer (A) through X-ray photoelectron spectrometry with an X-ray source of 1254.0 eV in a vacuum of at most $1 \times 10^6$ Torr at a photoelectron emission angle of 90°, and
   the oxygen atom concentration of the resin film is obtained by controlling the oxygen atom concentration to be from 5 to 20% by applying oxidation treatment to the surface of the print layer (A) via corona discharge treatment at applied energy of from 600 to 12,000 J/m$^2$.

2. The resin film according to claim 1, wherein the thermoplastic resin in both the gloss-imparting layer (B) and the substrate layer (C) is a polyolefin resin.

3. The resin film according to claim 1, wherein the resin film is stretched in at least one direction.

4. The resin film according to claim 1, wherein the surface layer of the print layer (A) of the resin film is coated with an antistatic agent and/or an anchor agent.

5. A method for producing a resin film comprising a multilayer structure of a print layer (A), a gloss-imparting layer (B) and a substrate layer (C) as laminated in that order, wherein the print layer (A) comprises from 90 to 100% of a propylene random copolymer having a melting point of from 70 to 142° C. or a mixture of a propylene random copolymer and an ethylene copolymer comprising ethylene in an amount of more than 50% and from 0 to 10% of an inorganic fine powder and/or an organic filler, the gloss-imparting layer (B) comprises from 70 to 100% of a thermoplastic resin and from 0 to 30% of an inorganic fine powder and/or an organic filler, and the substrate layer (C) comprises a thermoplastic resin; and wherein the resin film has a glossiness (JIS P-8142), as measured on the surface side of the print layer (A), of from 70 to 110%, the resin film has an oxygen atom concentration, as measured through X-ray photoelectron spectrometry on the surface side of the print layer (A), of from 5 to 20%;
   the method comprising controlling the oxygen atom concentration to be from 5 to 20% by applying oxidation treatment to the surface of the print layer (A) via corona discharge treatment at applied energy of from 600 to 12,000 J/m$^2$.

6. The method for producing a resin film according to claim 5, which comprises laminating the print layer (A), the gloss-imparting layer (B) and the substrate layer (C) in a co-extrusion method followed by stretching in at least one direction.

7. The method for producing a resin film according to claim 5, which comprises laminating the print layer (A) and the gloss-imparting layer (B) on the substrate layer (C) in a lamination method followed by stretching in at least one direction.

8. A printed matter comprising the resin film according to claim 1.

9. An adhesive label comprising the resin film according to claim 1.

10. An in-mold label comprising the resin film according to claim 1.

11. A resin molded article produced using the in-mold label according to claim 10 so that the label may be integrated with resin in a mold.

* * * * *